United States Patent [19]

Bartholomay et al.

[11] 4,207,433
[45] Jun. 10, 1980

[54] TEST ARRANGEMENT FOR COMMUNICATION PATHS IN TIME-DIVISION MULTIPLEXED SWITCHING SYSTEMS

[75] Inventors: William G. Bartholomay, Chicago; Gordon W. Couturier, St. Charles, both of Ill.; Suhas Ghosh, San Jose, Calif.; Melvin Winn, Boca Raton, Fla.

[73] Assignee: International Telephone and Telegraph Corporation, New York, N.Y.

[21] Appl. No.: 945,206

[22] Filed: Sep. 25, 1978

[51] Int. Cl.² .............................................. H04J 3/14
[52] U.S. Cl. .................................. 370/13; 179/175.23
[58] Field of Search ..................... 179/15 BF, 175.2 R, 179/175.2 B, 175.2 C, 15 AT, 18 FC, 175.23

[56] References Cited

U.S. PATENT DOCUMENTS

| 3,823,269 | 7/1974 | Saito ............................ 179/15 BF |
| 4,064,369 | 12/1977 | Battocletti ...................... 179/15 BF |

Primary Examiner—Bernard Konick
Assistant Examiner—Joseph A. Popek
Attorney, Agent, or Firm—James B. Raden; Donald J. Lenkszus

[57] ABSTRACT

An arrangement is described for testing a communication path to a 2-wire analog line through a time-division multiplexed switching system, wherein each analog line is coupled to the system by a hybrid circuit which provide separate transmit and receive paths. A digital tone source is coupled to a time-division bus of the system such that the digital tone source transmits signals toward the line on the receive path. A ring relay associated with the line is operated to produce an open circuit condition between the hybrid circuit and the line. The open circuit alters the transhybrid loss of the hybrid circuit such that the signals on the receive path are reflected back toward the time-division bus on the transmit path. A digital tone detector is coupled to the transmit path such that the reflected signals may be detected.

10 Claims, 1 Drawing Figure

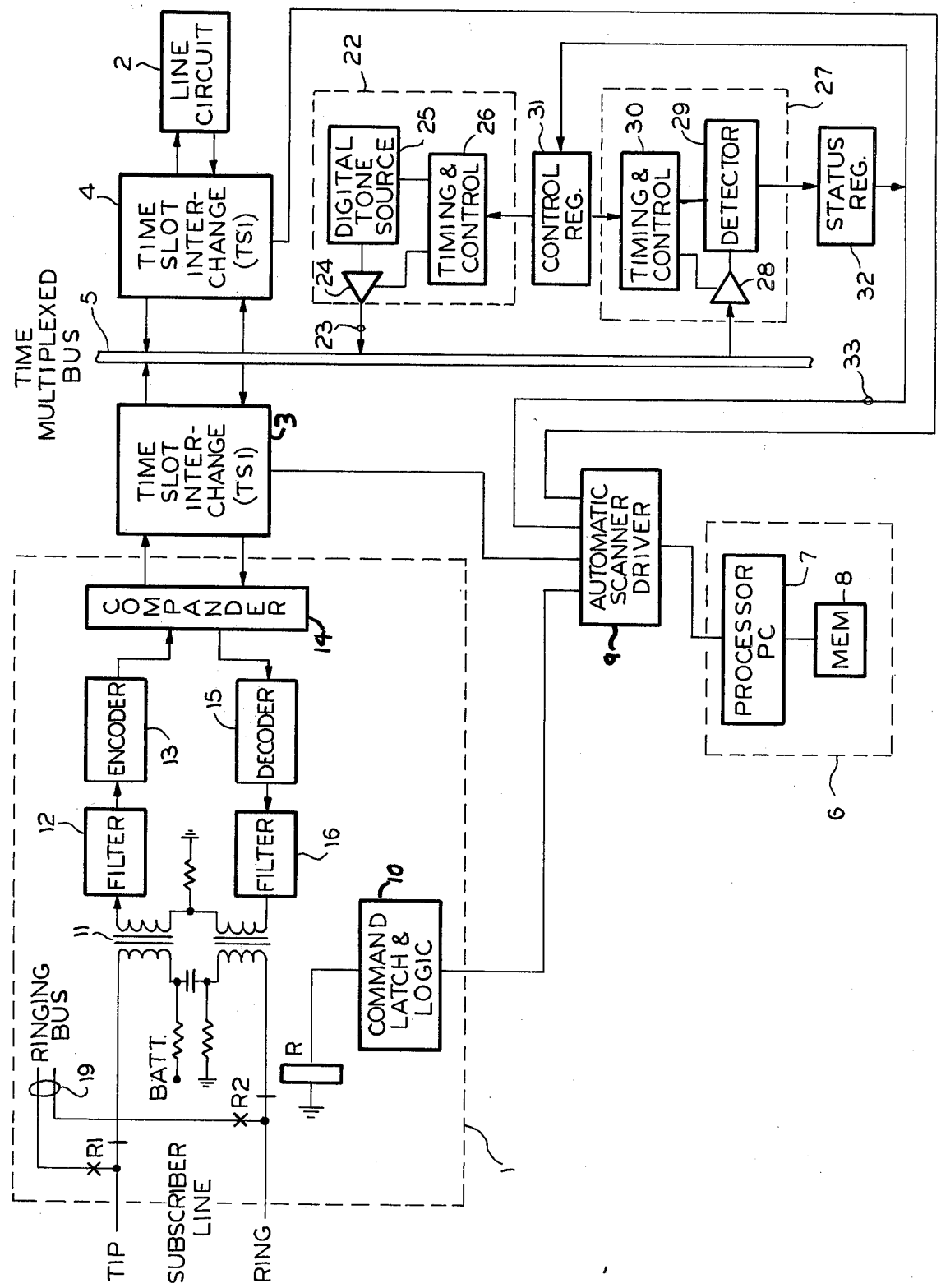

TEST ARRANGEMENT FOR COMMUNICATION PATHS IN TIME-DIVISION MULTIPLEXED SWITCHING SYSTEMS

BACKGROUND OF THE INVENTION

This invention relates to testing arrangements for communication switching systems in general and to an arrangement for testing a communication path within a time-division multiplexed (TDM) telephone switching system in particular.

In prior telephone switching systems having analog switching networks, each path through the switching system is tested for continuity prior to establishing a voice path connection. Typically, such continuity tests were provided by d.c. current detectors which would automatically be connected to a path to detect for a d.c. current flow.

One problem unique to digital switching systems is that each voice path is converted into two unidirectional paths, and the aforementioned techniques cannot be applied. In certain digital switching systems having a time-division multiplexed network, the equivalent of the analog continuity test is provided by including additional logic circuits for selectively connecting the transmit and receive paths of a digital line circuit together so that a digital test signal may be transmitted over one path and "looped-back" over the other path to a test circuit. However, such prior arrangements applied to digital systems will not determine if the analog-to-digital and digital-to-analog converters in a line circuit are operational. Such converters are typically complex and may contain relatively large numbers of components and because a large number of such converters are employed in a digital telephone switching system, it is desirable that the paths through the converters be tested.

SUMMARY OF THE INVENTION

In accordance with the invention, an arrangement is provided for testing a connection to a 2-wire analog subscriber line connected to a time-division multiplexed switching system via a hybrid circuit.

In accordance with the principles of the invention, a communication path to said line is tested by changing the transfer characteristics of the hybrid circuit during a test interval such that signals transmitted to the hybrid from the switching system on said path are reflected back toward said switching system, applying a test signal to said path and monitoring said path for reflected signals.

In one embodiment of the invention, the transhybrid loss characteristics of the hybrid are changed by opening connections between the hybrid and the subscriber line. A digital tone generator is connectable via a system time-division bus to a receive time slot associated with the subscriber line and the presence of reflected tones is detected on a transmit time slot associated with the subscriber line by a digital signal detector connectable to the time-division bus.

DESCRIPTION OF THE DRAWING

The invention may be better understood from a reading of the following description taken in conjunction with the drawing in which the single FIGURE illustrates a portion of a time-division multiplexed telephone switching system incorporating a testing arrangement in accordance with the principles of the invention.

DESCRIPTION OF THE PREFERRED EMBODIMENT

The telephone switching system of the FIGURE is substantially that shown in greater detail and described in U.S. patent application Ser. No. 829,669 filed Sept. 1, 1977, now U.S. Pat. No. 4,127,742 issued to G. Couturier et al. Specific details of the operation of that system may be obtaind by reference to the Couturier et al patent.

The system includes a plurality of line circuits 1, 2 connected to one or more time slot interchangers 3, 4. Each time slot interchange (of which only two are shown in the FIGURE) provides time slot allocation and memory for the speech paths, on the time multiplexed speech bus, the time slot interchange circuits and the time-division bus combinedly forming the time-division switching network for the interchange of data in digital form between the line circuits.

For controlling call processing, supervision, maintenance, testing and the like, a stored program processor complex 6 comprised of a processor 7 and attendent memory 8 is provided.

The time-division bus 5 is an 8-bit parallel D.C. bus which conveys 96 bidirectional time slots during each frame.

Interfacing between the processor complex 6 and line circuits 1, 2 is an automatic scanner driver unit 9 which detects the condition of a line circuit, feeds an indication of that condition to the processor complex 6 and maintains a memory of that condition for reference by the processor.

Thus, the system of the FIGURE comprises a stored program, time division multiplexed telecommunication system.

Line circuits 1 and 2 couple subscriber stations to the system. Line circuits for digital time division systems are well known. For example, see the line circuit of FIG. 3 in the aforereferenced Couturier patent and U.S. Pat. No. 3,997,738 issued Dec. 14, 1976 to V. Korsky et al.

A line circuit responds to condition changes on the line, such as the subscriber going off-hook and on-hook and provides a signal which can be read by the automatic scanner driver 9. The line circuit must provide coding and decoding, battery feed and other common line circuit features. It interfaces with the time slot interchanger 3 over a pair of leads and with the automatic scanner driver 9 over a bidirectional signaling lead common to other line or terminal circuits.

The line circuit 1 includes a ring relay R having sets of contacts R1 and R2 connected to the subscriber line tip and ring leads respectively. Relay R is controlled by the automatic scanner driver 9 via a command latch and logic circuit 10. When the relay R is not energized, a speech path from the subscriber line to hybrid transformer 11 is closed. When relay R is energized, the speech path from the subscriber line to the hybrid transformer 11 is opened and a path from the subscriber line to a common ringing bus 19 is closed. Relay R is held energized during the entire ringing period.

The speech path may be traced from subscriber line tip and ring leads to the hybrid transformer 11 wherein two to four wire conversion occurs splitting the speech paths into transmit and receive paths. The transmit path is traced from the hybrid transformer 11 to a low pass filter circuit 12, to an encoder circuit 13 which converts the analog signals to linear pulse code modulated (pcm) signals, and to a compander circuit 14 which additionally filters and converts the linear pcm signals into compressed pcm signals to the time slot interchanger 3, as is well known in channel bank technology.

The receive path is similarly traced backwards from the time slot interchanger 3 to the compander where compressed pcm signals from the time slot interchanger 3 are filtered and converted to linear pcm signals, to the decoder 15 where the linear pcm signals are converted to analog signals, to the low pass filter 16 and then to the hybrid transformer 11.

The time slot interchangers 3 and 4 are as described herein above connected to a time-division bus 5.

A test transmitter 22 is connected to the time division bus 5 by means of line 23. The test transmitter includes a tri-state buffer 24 connected to the line 23 and to a digital tone source 25. A timing and control circuit 26 is connected to the buffer 24 and the tone source 25. A test receiver 27 includes connections to the time-division bus 5 by means of a tri-state buffer 28 which has its output connected to a detector circuit 29. The test receiver further includes a timing control circuit 30 having connections to the tristate buffer 30 and detector 29. The tri-state buffers are provided so that when the test transmitter and receiver are idle, no loading of the time-division bus will occur. Both the test transmitter 22 and the test receiver 27 receive controlling information from a control register 31 which is of the serial-in-parallel out type and which has inputs connected to the automatic scanner driver 9. Output data generated by the test receiver 27 is transmitted to the automatic scanner driver 9 via register 32 which is of the parallel-in-serial out type. The registers 31 and 32 are connected to the automatic scanner driver via bidirectional bus 33.

The digital tone source 25 generates pcm samples representative of a 1 KHz 0dBm tone and may be of a type well known in the art. For example, see U.S. Pat. No. 3,706,855 issued Dec. 19, 1972 to S. Pitroda et al for a representative digital tone generator.

The detector circuit 29 includes both a digital frequency detection circuit and a digital level detection circuit both of which may be of types known in the art. The detector circuit outputs are scanned at period intervals by the automatic scanner driver 9 via status register 32 during test intervals.

Both timing and control circuits 26 and 30 include logic which duplicates the functions of the time slot interchanger which is shown in greater detail in the aforementioned G. Couturier et al patent. The description of the time slot interchanger of the G. Couturier et al patent is incorporated herein by reference. More specifically, both timing and control circuits receive control data from the automatic scanner driver 9 via control register 31 which identifies the time slots on the time-division bus for transmitting or receiving tone samples.

When the subscriber line connected to line circuit 1 is a terminating or called party, the operative sequence relevant to the invention is as follows. The automatic scanner driver 9 causes the relay R to be energized thereby opening the speech path from the subscriber line to the hybrid transformer 11 and closing the path from the subscriber line to the ringing bus. The automatic scanner driver 9 transmits control information to the test transmitter 22 and test receiver 21. The test transmitter 22 is connected via the time-division bus 5 and time slot interchanger 3 to the receive channel of the subscriber line and the test receiver 27 is similarly connected to the transmit channel of the subscriber line.

Compressed pcm tone samples representative of a 1 KHz 0dBm tone are transmitted from the test transmitter over the time-division bus 5 through the time slot interchanger 3 to compander 14. Compander 14 filters and converts the compressed pcm tone samples into linear pcm samples on the line circuit receive path. Decoder 15 converts the linear pcm samples into a 1 KHz 0dBm analog tone which is applied through filter 16 to the hybrid transformer 11.

The hybrid transformer has its subscriber windings opened by action of the relay R and therefor has a low transhybrid loss which results in most of the analog tone being reflected back toward the system on the transmit path.

The reflected analog signal is converted to linear pcm samples by the encoder 13, filtered and compressed by compander 14 and forwarded to the time slot interchanger 3 in the subscriber transmit time slot. The test receiver 27 receives the pcm samples via the time division bus 5. The detector circuit 29 will generate output signals if the received tone samples are representative of a 1 KHz tone at a predetermined level which is based on expected variation in the hybrid transformer 11, decoder 15, filters 16 and 12 and encoder 13.

On a periodic basis, the automatic scanner driver 32 interrogates the output status of the detector 29 via the status register 32. The above-described sequence will continue until the automatic scanner driver transmits control information to the register 31 which will cause the test transmitter 22 and test receiver 27 to assume an idle state.

If the tone generated by the test transmitter 22 is received by the test receiver 27 and is of a predetermined amplitude, then an operational speech path exists up to the hybrid transformer 11. The test transmitter 22 and test receiver 27 are idled. When the subscriber line goes offhook, the automatic scanner driver will cause the relay R to be deenergized thereby removing ringing tone and closing the speech path from the subscriber line to the hybrid transformer 11.

If, however, the test receiver 27 does not detect a reflected tone of proper frequency and/or amplitude, then continuity does not exist up to the hybrid 11 for example, a minor system alarm may be set.

As will be apparent to those skilled in the art, the reflection test arrangement may be equally applied to testing of other terminal circuits. Further, although the testing sequence described occurs while the ring tone is supplied to a subscriber line, testing may occur at other predetermined times. For example, the same testing arrangement may be applied to originating calls to check both transmit and receive paths. In this case, use of a dial tone detector may be more convenient. Further, although a transformer hybrid circuit has been shown in the embodiment, the test arrangement will work equally well where an electronic hybrid circuit is used. Still further, although the test arrangement has been described in conjunction with a specific time division multiplexed switching system, it may be applied to other such switching systems. It will be further apparent to those skilled in the art that yet other modifications may be made without departing from the spirit and scope of the invention.

What is claimed is

1. A testing arrangement for a time-division multiplexed switching system, said system including a plurality of lines, a time-division bus, and means for selectively coupling each of said plurality of lines to receive and transmit time slots of said time-division bus, said testing arrangement comprising:
means for selecting one of said plurality of lines for testing;
means for generating test signals during a receive time slot associated with one of said selected line;
means for altering the transmission characteristics of said selected line such that at least a portion of each of said test signals is reflected onto a transmit time slot associated with said selected line; and
means for receiving said reflected portion of said signals during said transmit time slot.

2. A testing arrangement in accordance with claim 1, wherein said receiving means comprises means for detecting said reflected portion of said signals and for generating a first indication signal when said reflected portion of said signals has predetermined characteristics.

3. A testing arrangement in accordance with claim 2, wherein each of said plurality of lines is an analog line, each said analog line being connected to one of a corresponding plurality of hybrid circuits, each said hybrid circuit providing a transmit path coupled to one of said transmit time slots of said time-division bus via a digital-to-analog converter and a receive path coupled to one of said receive time slots to said time-division bus via an analog-to-digital converter.

4. A testing arrangement in accordance with claim 3, wherein said generating means comprises a digital tone source connectable to said time-division bus during the transmit time slot associated with the transmit path of said line selected for testing.

5. A testing arrangement in accordance with claim 4, wherein said means for detecting and generating comprises means for generating said first indication signal when said reflected portion of said signals represents a tone having at least a predetermined amplitude.

6. A testing arrangement in accordance with claim 4, wherein said means for detecting and generating comprises means for generating said first indication signal when said reflected portion of said signals represents a tone having predetermined frequency.

7. A testing arrangement in accordance with claim 4, wherein said means for detecting and generating comprises means for generating said first indication signal when said reflected portion of said signals represents a tone having a predetermined frequency and amplitude.

8. A testing arrangement in accordance with claims 3, 4, 5, 6 or 7, wherein said altering means comprises a plurality of ringing circuits each connected between a corresponding one of said plurality of lines and a corresponding one of said plurality of hybrid circuits, each said ringing circuits being operable in a first state to establish a connection between a corresponding one of said plurality of lines and a corresponding one of said plurality of hybrid circuits and operable in a second state to alter the transhybrid loss of said hybrid circuit.

9. A testing arrangemet in accordance with claim 8, wherein said second state is an opening of said connection.

10. A testing arrangement in accordance with claim 9, wherein said selecting means selects one of said plurality of lines for testing when a line is to receive ringing tone.

* * * * *